UNITED STATES PATENT OFFICE.

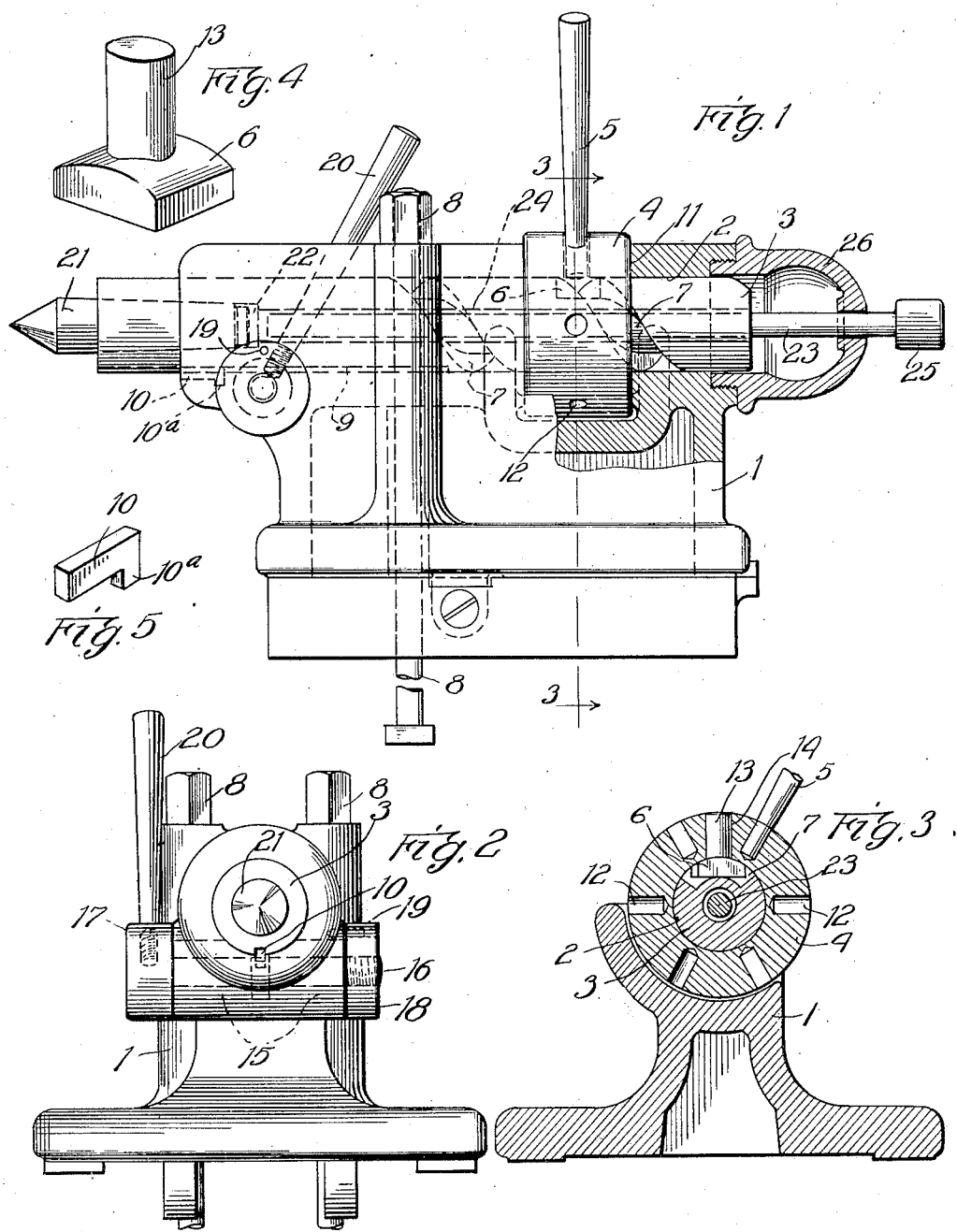

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

TAILSTOCK.

1,357,362.      Specification of Letters Patent.      Patented Nov. 2, 1920.

Application filed September 30, 1918. Serial No. 256,170.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Tailstocks, of which the following is a specification.

The invention relates to tail stocks for lathes and the like, and is especially designed for use in lathes or other machine tools which are employed in quantity work production.

In tail stocks heretofore employed, a movable spindle, which carries the work center, is commonly actuated to move the center into and out of holding position, by means of a hand wheel having a threaded engagement with the spindle. This method of actuating the spindle has been found objectionable in that it necessarily consumes a considerable amount of time. It is, therefore, the primary object of the present invention to provide a tail stock which will materially increase the efficiency of the machine tool upon which it is used, in that it is provided with means for enabling the rapid actuation of the work spindle, so that the work may be quickly mounted in or removed from position in the machine.

The object of the invention thus generally stated, together with other and ancillary advantages, is attained by the construction and arrangement illustrated in the accompanying drawings forming part hereof, in which—

Figure 1 is a side elevation partially in section of a tail stock embodying the features of my invention. Fig. 2 is a front end elevation of the same. Fig. 3 is a vertical sectional view taken on line 3—3 of Fig. 1. Fig. 4 is a detached perspective view of a part of the spindle actuating means. Fig. 5 is a detached perspective view of the key employed for preventing a rotation of the spindle.

In the drawings, 1 indicates a base having a longitudinal bore 2 therein for a spindle 3, and 4 is a collar rotatable upon the spindle by means of a lever 5 and having a cam shoe 6 operable in a spiral cam groove 7 in the spindle whereby to move the spindle longitudinally relative to the base 1.

The base 1 may be of any preferred form and is arranged to be clamped in fixed position upon the bed of the machine in which it is employed, as by means of bolts 8. The bore 2 in which the spindle 3 is operable extends throughout the length of the base, and extending longitudinally of the spindle is a key-way 9 in which a key 10 mounted in the base is arranged to operate so as to prevent the rotation of the spindle in the bore 2. The key-way 9 terminates substantially centrally of the spindle and its rear end abutting against the key 10 serves to limit the forward movement of the spindle in the base. For this purpose, the key is provided with a lug 10$^a$ adapted to hold the key against movement in the base.

For the collar 4, which is rotatable on the spindle 3, the base 1 is provided with a transverse slot 11 of a size adapted to neatly receive the collar and prevent its endwise movement relative to the base. The lever 5 by which the collar is arranged to be rotated, has a rounded stem at its inner end which is adapted to be entered into any one of a series of circumferentially arranged openings 12 in the collar; and the cam shoe 6 by which the spindle 3 is actuated in the rotation of the collar is formed on the inner end of a pivot stud 13 entered through a radial opening 14 in the collar. The outer surface of the cam shoe is rounded to conform to the inner circumference of the collar, and the shoe is made of a size to fit neatly in the spiral cam groove 7 of the spindle 3.

The cam groove 7 is made of a length to extend forwardly a substantial distance from the rear end of the spindle, and it will be seen that by the use of the lever 5 in connection with several openings 12 in the collar, the cam shoe may be rotated through one or more revolutions. Thus the spindle has a substantial range of movement. Preferably, however, the parts are so proportioned and arranged that ordinarily an operation of the cam shoe through less than a complete revolution will be sufficient to impart to the spindle the required movement. Herein, in providing the slot 11 in the base 1, the latter is cut away to permit a swinging movement of the lever 5, while entered in one of the openings 12, which will impart to the spindle 3 a longitudinal movement sufficient for most purposes.

Any preferred means may be employed to lock the spindle in position after it has been adjusted by an operation of the lever 5. Herein a pair of notched bushings 15 (dotted lines Fig. 2) are mounted upon a bolt 16 which extends through the base and has a head 17 and a nut 18 on opposite sides of the base. The nut 18 is held against rotation by means of a pin 19, and the bolt is arranged to be rotated by a lever arm 20 threaded into the head 17, whereby to cause the notched bushings to clamp the spindle 3 in position.

At its forward end, the spindle 3 carries the usual work center 21 entered in a tapered bore 22. For facilitating the removal of the center, a knock-out rod 23 may be provided. This rod may extend through a longitudinal bore 24 opening at its forward end into the bore 22, and at its rear end the rod may be provided with a head 25. Preferably, a cap 26 threaded into the base 1 forms a bearing for the rear end of the rod 25 and also serves to prevent the entrance of dust and dirt into the spindle bore 2 in the base and into the cam groove 7.

It will be seen that I have provided a tail stock of a very practical character in that the work center may be very rapidly moved into and out of holding position with great facility. Furthermore, the construction is very simple so that it may be economically manufactured, and it is not likely to get out of order.

While I have herein illustrated and described the invention with considerable particularity, it will be understood that it is not limited to the construction and arrangement set forth except as may be necessitated by the state of the prior art.

I claim as my invention:

1. A tail stock comprising a base adapted to be clamped in a fixed position and having a through bore, a center, a spindle carrying said center and operable in said bore, said spindle having a spiral cam groove therein, a collar rotatable on said spindle and having a cam shoe operable in said groove, said collar being held against movement longitudinally of the base, means for holding said spindle against rotation, and a lever for rotating the collar and thereby the cam shoe in said groove whereby to actuate the spindle longitudinally of the base.

2. A tail stock having, in combination, a base having a transverse slot, a spindle slidably but non-rotatably mounted within the base and having a spiral cam groove, a sleeve in said slot encircling said spindle, and a detachable cam shoe carried by said sleeve adapted to coöperate with said groove.

3. A tail stock having, in combination, a base, a spindle slidably but non-rotatably mounted within the base and having a spiral cam groove, and means coöperating with the groove to move the spindle longitudinally comprising a collar rotatable upon the spindle but held against longitudinal movement relative to the base, said collar having a radial opening therein, and a member having a stem entered in said opening in the collar and a shoe operable in said groove.

4. A tail stock having, in combination, a base, a spindle movable longitudinally within the base and having a spiral cam groove, and means coöperating with the groove to move the spindle longitudinally comprising a rotatable cam shoe engaging in said groove in the spindle, and a member for rotating the shoe.

5. In a lathe, in combination, a base having a longitudinal member, a spindle in said member, a collar rotatable on said spindle and restrained against longitudinal movement, a lever adapted to be inserted into any one of a plurality of holes in said collar, said base being shaped to provide clearance allowing said lever to rotate with said collar down to a horizontal position on one side and down to an inclined position below the horizontal on the other side.

6. A tail stock having, in combination, a base having a longitudinal bore, a spindle slidably but non-rotatably mounted in said bore and having a spiral cam groove throughout a portion of its length, means coöperating with said cam groove for sliding said spindle, and clamping means in front of said feeding means for engagement with the smooth portion of said spindle, said groove being cut into a relatively small fraction of the area of said spindle whereby the remaining cylindrical surface provides ample bearing area for engagement with said clamping means.

7. A tail stock having, in combination, a base having a longitudinal bore, a spindle in said bore, a center in said spindle, said spindle having an axial hole, a knockout rod in said hole, and a cap covering the rear end of said bore and constituting a guide for said knockout rod.

8. A tail stock having, in combination, a base having a longitudinal bore, a spindle having a central longitudinal hole, a work center carried by the spindle, means for moving the spindle, a cap threaded into the rear end of the base so as to close the rear end of said bore for the spindle, said cap having an opening therein, and a knock-out rod for the work center bearing at its rear end in the opening in the cap and extending into the hole in the spindle.

9. In a lathe, in combination, a base having a longitudinal bore, a spindle in said bore, a collar rotatable on said spindle and restrained against longitudinal movement, a lever adapted to be inserted into any one of a plurality of holes in said collar, said base being shaped to provide clearance allowing said lever to rotate with said collar through more than one half revolution, and an operative connection between said collar and said spindle.

10. A tail stock having, in combination, a base having a longitudinal bore, a spindle slidable in said bore, a lever projecting radially with respect to said spindle intermediate the ends thereof and adapted by rotation in a plane normal to the axis of said spindle to feed said spindle, and a locking lever at the front end of said base rotatable in a vertical plane parallel to the axis of said spindle.

11. In a lathe, in combination, a base having a longitudinal member, a spindle in said member, a collar rotatable on said spindle and restrained against longitudinal movement, a lever adapted to be inserted into any one of a plurality of holes in said collar, said base being shaped to provide clearance allowing said lever to rotate with said collar down to a horizontal position on one side and down to an inclined position below the horizontal on the other side, and a locking lever at the front end of said base rotatable in a vertical plane parallel to the axis of said spindle and located on the opposite side of said base from the side on which said first mentioned lever may move below the horizontal.

12. In a lathe, in combination, a base having a longitudinal member, a spindle in said member, a collar rotatable on said spindle and restrained against longitudinal movement, a lever adapted to be inserted into any one of a plurality of holes in said collar, said base being shaped to provide clearance allowing said lever to rotate with said collar down to a horizontal position on one side and down to an inclined position below the horizontal on the other side, and a locking lever at the front end of said base rotatable in a vertical plane parallel to the axis of said spindle.

13. A tail stock having, in combination, a base, a spindle, said spindle having a spiral groove cut in a relatively small fraction of the area of its cylindrical surface, whereby the remainder of said cylindrical surface provides ample bearing area for engagement with clamping means, means engaging said groove for advancing the spindle, and means for locking the spindle in adjusted position.

In testimony whereof, I have hereunto set my hand.

GUSTAF DAVID SUNDSTRAND.